United States Patent [19]
Wirz

[11] 3,807,270
[45] Apr. 30, 1974

[54] APPARATUS FOR CUTTING A THREAD ON A DRAW-SPIN-WINDING MACHINE

[75] Inventor: Armin Wirz, Dietlikon, Switzerland

[73] Assignee: Rieter Machine Works, Ltd., Winterthur, Switzerland

[22] Filed: Feb. 23, 1972

[21] Appl. No.: 228,514

Related U.S. Application Data

[63] Continuation-in-part of Ser. No. 870,522, Oct. 21, 1969.

[30] Foreign Application Priority Data
Nov. 6, 1968 Switzerland.................... 16659/68

[52] U.S. Cl.................. 83/571, 83/100, 83/362, 83/371, 83/402, 83/580, 83/587, 83/605, 83/639
[51] Int. Cl............................ B26d 5/12, B26d 5/38
[58] Field of Search............ 83/362, 639, 616, 100, 83/586, 587, 585, 582, 571, 572, 402, 580, 605, 607, 609, 371

[56] References Cited
UNITED STATES PATENTS

| 3,452,572 | 7/1969 | Bramley et al.............. 83/587 X |
| 3,153,966 | 10/1964 | Frederick et al.............. 83/571 |
| 3,659,779 | 5/1972 | Berkman et al.............. 83/571 X |
| 3,142,219 | 7/1964 | Martin.............. 83/639 |
| 627,153 | 6/1899 | Tennant.............. 83/639 X |
| 3,036,798 | 5/1962 | Martin.............. 83/639 UX |
| 3,564,958 | 2/1971 | Richter.............. 83/100 |
| 3,640,160 | 2/1972 | Nelson et al............... 83/100 X |
| 3,196,727 | 7/1965 | Pray.............. 83/607 X |
| 3,279,295 | 10/1966 | Teplitz.............. 83/607 X |

Primary Examiner—Frank T. Yost
Attorney, Agent, or Firm—Kenyon & Kenyon Reilly Carr & Chapin

[57] ABSTRACT

The cutting means and suction means are arranged above the detection means so as to, first, draw in the thread against the suction means and to, second, sever the thread while the free end is then drawn into the suction means. Both the cutting means and the suction means are pneumatically activated in response to the detection of a disturbance in the thread path by the detecting means.

8 Claims, 10 Drawing Figures

APPARATUS FOR CUTTING A THREAD ON A DRAW-SPIN-WINDING MACHINE

This application is a continuation-in-part of copending application Ser. No. 870,522 filed Oct. 21, 1969.

This invention relates to a method and apparatus for processing a thread on a spin-draw-winding machine. More particularly, this invention relates to a method and apparatus for detecting and correcting thread defects in a thread processed on a spin-draw-winding machine.

Spin-draw-winding machines have been known in which a plurality of endless filaments after emerging from a spinneret change from a plastic state into a rigid state in a spinning cabinet. The filaments are then provided with a finish on a preparation roll, collected into a thread, strengthened by drawing in a drawing device and finally taken up into a package on a winding device.

Such spin-draw-winding machines, as are known, operate at very high thread speeds. As a result thread breakage which usually occur in the drawing zone as a rule and cause laps on the drawrolls, must be detected early because of the fast accumulation of large quantities of material which can be eliminated only with considerable effort and prolonged downtime. The same holds true for laps forming on the winding device.

Further, the thread cutting devices provided for cutting the thread and usually arranged upstream from the first drawroll as shown e.g., in Swiss Pat. No. 494,832 issued Sept. 30, 1970 have not performed satisfactorily on a spin-draw-winding machine. This is because, after cutting the thread upstream from the drawing arrangement, more thread keeps being supplied by the spinneret which supply cannot be stopped without much time and trouble due to the spinning pressure acting on the spinneret. Retrieval of the thread end for re-threading has also proven very difficult. A decisive shortcoming develops, however, if thread tension in the input thread is eliminated by cutting, which immediately causes either lapping on the thread transporting elements or interrupton of the taking-off of the filaments from the spinning filaments. This results in inadmissible material accumulations in the spinning cabinet, clearing of which necessitates time-consuming work. Furthermore, a conventional cutting device cannot effect a clean cut at the high operating speeds usually used on spin-draw-winding machines, as the time needed for the cutting process of conventional cutting devices is too long. As a result, a few outer filaments of the thread are cut first while the other filaments are still drawn through the cutting device. This results in an accumulation of the filaments already severed on the cutting device which impairs the cutting function.

Accordingly, it is an object of the invention to permit a simple picking up of a thread for severing in a spin-draw-winding machine.

It is another object of the invention to maintain thread tension after severing of the thread to correct a disturbance in the thread path.

It is another object of the invention to sever a thread in a spin-draw-winding machine in a rapid manner to effect a clean cut.

It is another object of the invention to position a thread in a spin-draw-winding machine in a predetermined position for severing.

Briefly, the invention provides a method and apparatus in which a thread being processed in a high speed machine such as a spin-draw-winding machine, draw-twisting machine, draw-winding machine, rewinding machine and simple winding machine, can be held in a predetermined position to permit easy pick-up and maintaining of the thread tension after severing of the thread if a disturbance occurs in the thread path.

The method is incorporated into the overall spin-draw-winding process in which a plurality of endless filaments emerging from a spinning cabinet are combined into a thread, drawn and wound up. The method includes the steps of detecting the occurrence of a disturbance in the thread path, and in response to the detection of a disturbance, of drawing the thread into a predetermined position and severing the thread downstream of this position. At the same time, the thread is maintained under a tension sufficient to maintain the thread path at the predetermined position. The thread can be drawn into the predetermined position pneumatically and in such a case can be held under the same pneumatic pressure to insure the maintenance of the thread tension. Further, the thread, after being severed, can be pneumatically separated into the individual filaments by a vortex so that the thread tension is increased considerably.

The apparatus of the invention includes a detection means arranged at some point in the path of the thread, such as at the drawing device or at the winding device, to be activated by a disturbance in the thread path, a thread cutting means arranged upstream of the detection means with respect to the thread path, and a suction means upstream of and in close vicinity to the cutting means for drawing in the thread. The suction means is also set close to the thread path and with the cutting means is activated by the detection means.

Once a thread disturbance is detected, the suction means is activated to draw in the thread. The cutting means is then activated to sever the thread while the suction means then draws in the cut end of the thread to maintain the thread under tension. To this end, the cutting means is provided with a pneumatic force accumulator to permit a delay of the cutting action with respect to the activation of the suction means as well as to allow the build up of a pressure sufficient to effect a rapid cutting action. The thread can then be rethreaded after the disturbance has been corrected and the spin-draw-winding process can be restarted.

In order to provide for a delay in actuation of the cutting means a hold means is provided. This hold means, in one embodiment, is in the form of a spring biased ball which engages within a groove, or the like, in a piston rod which, in turn, is connected to a pivotal blade of the cutting means. The ball serves to hold the piston rod in place until a sufficient force is built up in the accumulator to overcome the spring force on the ball.

In another embodiment, the hold means is in the form of a pneumatically actuated piston rod which engages under a spring biasing force within a groove in the piston rod of the cutting blade. In this embodiment, the pneumatic pressure in the accumulator and the pneumatic pressure on the piston rod of the hold means are correlated to cause retraction of the hold means piston rod while activating the cutting blade.

In still another embodiment, the hold means is in the form of an electromagnetic means which is actuated in the same manner as the cutting means by an impulse from the detection means or from a manually applied impulse.

These and other objects and advantages of the invention will become more apparent from the following detailed description and appended claims taken in conjunction with the accompanying drawings in which:

FIG. 1 schematically illustrates a spin-draw-winding machine utilizing the method and apparatus of the invention;

Figure 7:
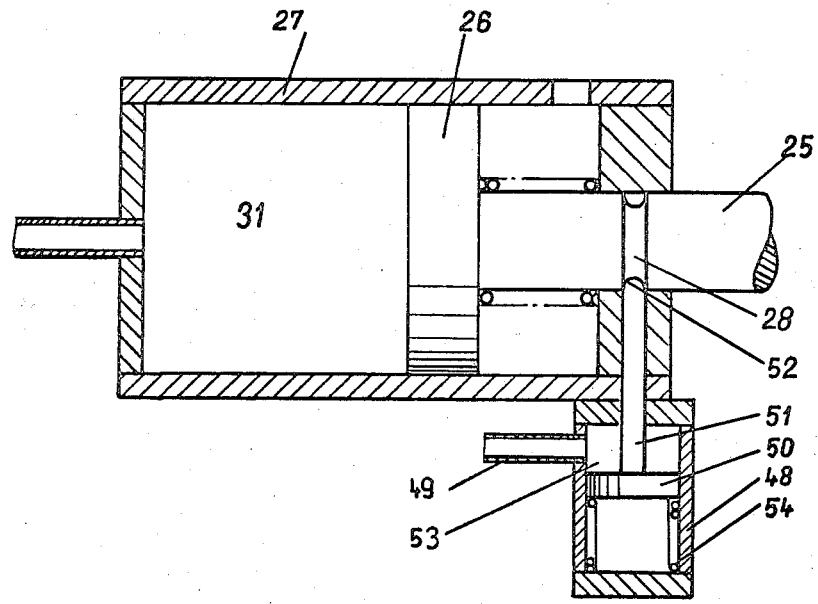
FIG. 7 illustrates a cross-sectional view of a modified accumulator for a cutting means according to the invention.
Figure 8:
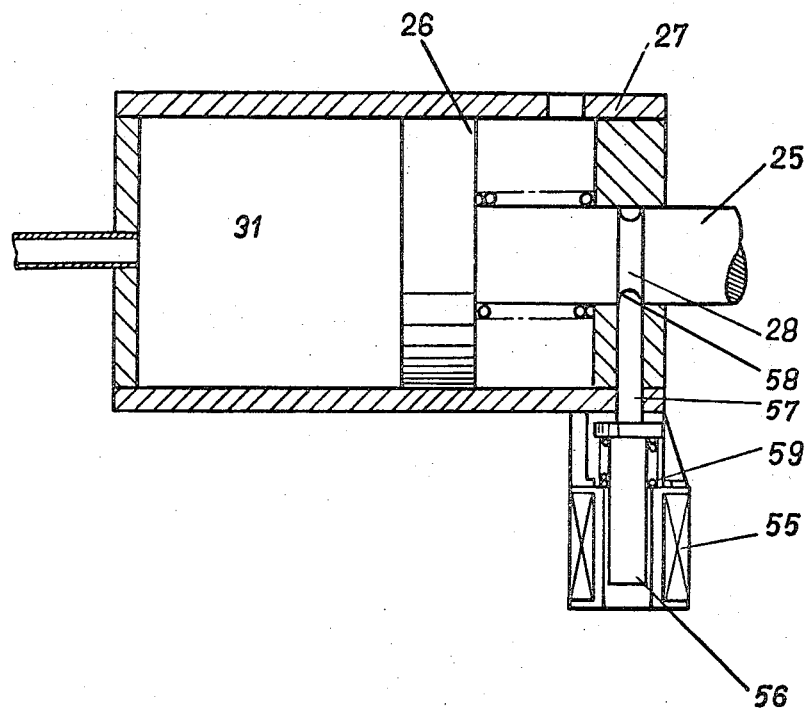
FIG. 8 illustrates a cross-sectional view of a further modified accumulator for a cutting means according to the invention.
Figure 9:
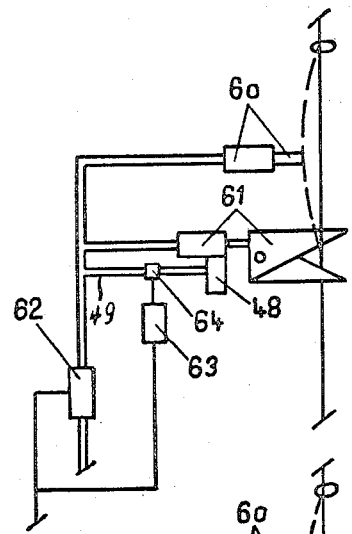
Figure 10:
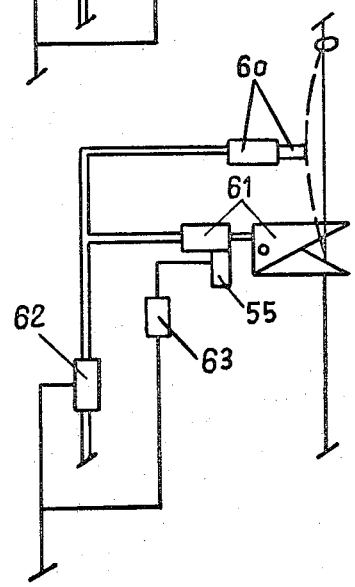

FIG. 9 schematically illustrates the accumulator of FIG. 7 in a machine according to the invention; and FIG. 10 schematically illustrates the accumulator of FIG. 8 in a machine according to the invention.

Figure 1:
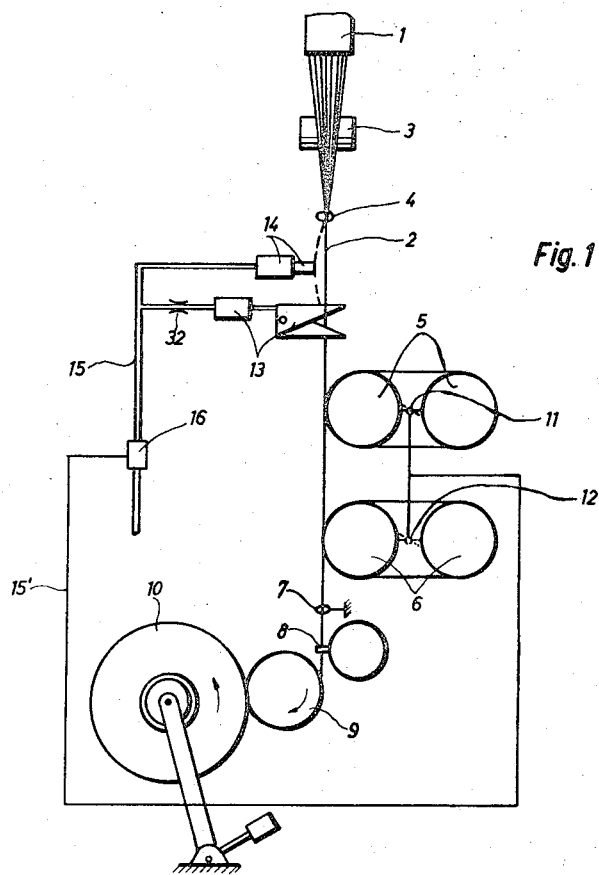

Referring to FIG. 1, the spin-draw-winding machine includes a spinning cabinet 1 from which a plurality of endless filaments originating from a spinneret (not shown) emerge, a finish roll 3 which applies a finish to the filaments and a thread guide 4 which combines the filaments into a thread 2. The machine also includes a drawing device having a pair of rotatable delivery rolls 5 and a pair of draw rolls 6 which rotate faster than the delivery rolls 5 and which draw the thread 2 at the usual drawing ratio. In addition, the thread 2 is passed through a stationary thread guide 7, a traversing device 8 as is known, and a drive roll 9 and is wound up in a known manner into a package 10.

The machine is further provided with a detection means 11, 12 each between the rolls of the delivery rolls 5 and draw rolls 6. Each detection means is activated in response to a lap formation on the rolls of the drawing device. A detection means can also be arranged near the free thread path and can be activated by a lack of thread tension.

A thread cutting means 13 is disposed upstream of the delivery rolls 5 adjacent the thread path for severing of the thread 2 in response to activation of the detection means 11, 12. In addition, a suction means 14 is disposed immediately upstream of the cutting means 13 closely adjacent to the thread path. The cutting means 13 and suction means 14 are connected in common to a duct 15 which is supplied with compressed air from a suitable source (not shown). An electromagnetic valve 16 is disposed in this duct 15 in order to control the flow of air from the duct 15 to the respective cutting means 13 and suction means 14. The valve 16 is activated either via an electrical connection 15' by an impulse from either of the detection means 11, 12 or manually.

Figure 2:
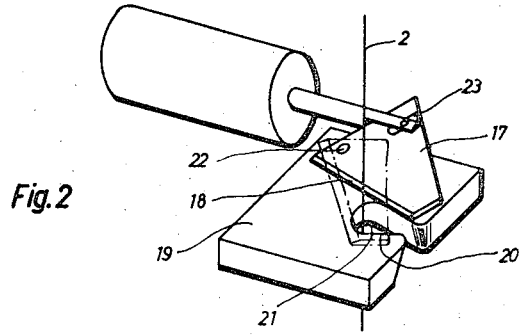
FIG. 2 illustrates a perspective view of a cutting means according to the invention.

Referring to FIG. 2, the cutting means 13 includes a pivotally arranged blade 17, the edge 18 of which rests on a plate 19. The plate 19 contains a stationary cutting edge 20 in the form of a U-shaped recess 21 enlarged somewhat towards the inside, through which recess 21 the thread 2 runs without touching in normal operation. The pivoting axis 22 of the blade 17 is arranged so that, in the cutting operation, the thread 2 is caught in the recess 21 and cannot, as in conventional cutting devices, escape to the outside, which occurs with increasing frequency as thread speeds increase. The blade 17 has a slot 23 through which a projection 24 (FIG. 3) of a piston rod 25 is inserted. The pivoting of the blade 17 is controlled by reciprocation of the piston rod 25 which is controlled by a piston 26 slidably arranged in a compressed air cylinder 27.

Figure 3:
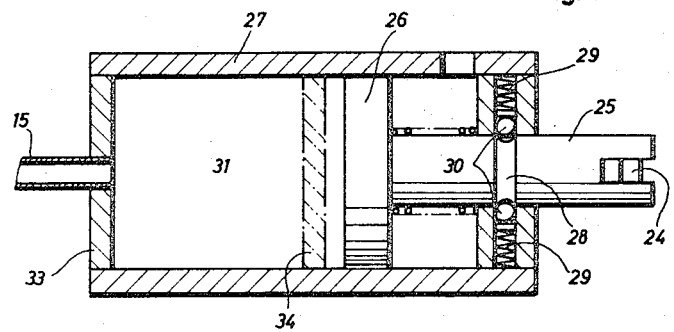
FIG. 3 illustrates a cross-sectional view of a accumulator of the cutting means according to the invention.

Referring to FIG. 3, in order to hold the blade 17 in an idle position in which thread 2 passes uninfluenced through recess 21, a hold means is provided. This hold means is constituted by a groove 28 in the piston rod 25 into which balls 30 are pressed by springs 29 acting radially towards the inside from all sides so as to hold the piston rod 25 in place and thus the blade 17. If valve 16 (FIG. 1) opens, activated by detection means 11 or 12, compressed air is supplied via duct 15 to cylinder 27 and after a certain, if very small, lapse of time, a relatively large room 31 in the cylinder 27 is filled with air and pressure is built up there. Once a certain pressure is reached, the spring force of the springs 29 is overcome and the balls 30 are pushed to the outside by the piston rod 25, whereupon the piston 26 is released and jerks to the right to effect movement of the blade 17 at high speed towards the stationary cutting edge 20.

The time needed for building up the pressure in the room 31 can be chosen by means of an exchangeable or adjustable throttle valve 32 (FIG. 1) inserted into the supply line upstream from the cylinder 27. From the illustration, it is evident that if the room 31, acting as an air regulator or accumulator, were not provided, i.e., if cylinder wall 33 were arranged in the position 34 indicated with dash-dotted lines, the desired delay of the start of the piston movement would not be achieved. Also, as the pressure in the initially very small room 31 would decrease rapidly at the start of the piston movement, the speed of the cutting movement would be lower.

Figure 4:
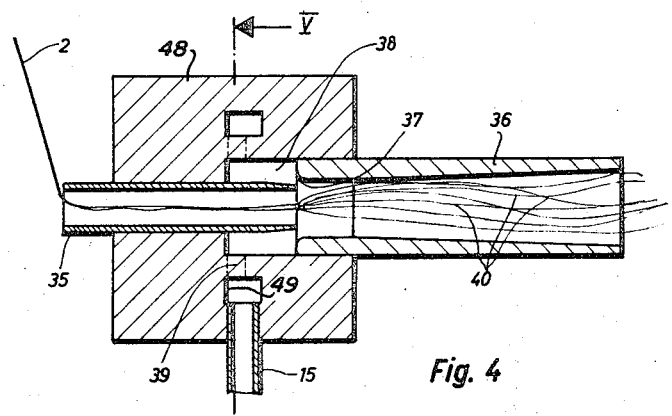
FIG. 4 illustrates a cross-sectional view of a suction means according to the invention.
Figure 5:
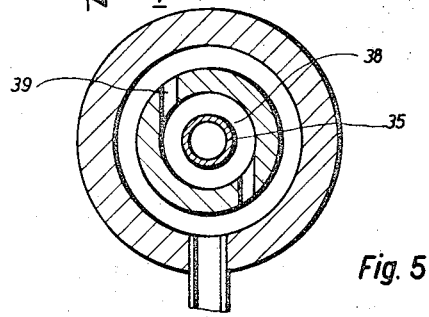
FIG. 5 illustrates a view taken on line V—V of FIG. 4.

Referring to FIGS. 4 and 5, the suction means 14 includes a suction tube 35 adjacent the thread path and a diffusor tube 36 into which the inner end of the suction tube 35 merges leaving an annular gap 37. Both the tubes 35, 36 are mounted in a suitable housing 48 so as to define a cylindrical room or chamber 38 which surrounds the inner end of the suction tube 35. This room 38 communicates via a pair of tangentially oriented ducts 39 to a circumferential manifold 49 in the housing 48 which connects with the duct 15. In this way, compressed air can be discharged into the room 38 from the air duct 15 and associated means so as to create a vortex therein as well as in the diffusor tube 36. For satisfactory performance, air flow cross-section areas must be chosen such that a sufficiently effective throttle point is formed which prevents a pressure drop in the supply duct 15 to the suction means 14, as sufficient pressure would not otherwise build up in the room 31 of the cutting means 13.

In operation, if one of the detection means 11, 12 is activated, the electromagnetic valve 16 is actuated so as to open the duct 15 to the passage of compressed air to the cutting means 13 and suction means 14. A high speed air vortex is then generated at the inner end of the suction tube 35 by the air emerging tangentially from the ducts 39 and is discharged into the diffusor tube 36 while air is sucked in through the suction tube 35 according to the ejector principle. Owing to this suction air stream, the thread 2 is diverted from the straight thread path, (indicated with dash-dotted lines in FIG. 1), to or closely to the inlet opening of the suction tube 35. Simultaneously, the pressure is built up in the room 31 of the cylinder 27 so that after a short lapse of time while the thread is drawn against the tube 35, the blade 17 is activated and severs the thread 2. As the free end of the thread is still being supplied from above, the end is sucked through suction tube 35 before it can escape from the vicinity of the inlet opening of the suction tube 35. The air vortex acting in the diffusor tube 36 separates the individual filaments 40 of the thread 2 so that the air force acting on the thread 2 and the thread tension in the suction means 14 are increased. This ensures the taking up of the thread still emerging from spinning cabinet 1 and prevents accumulation from occurring in the cabinet 1.

In order to rethread the thread by means of a threading air gun (not shown) the thread is taken over upstream from the suction tube 35 and re-threaded onto the thread transporting elements of the machine. After completion of the re-threading operation, the valve 16 is shut again either by hand or by resetting of the detection means 11, 12 into normal operating position. The pressure in the cylinder 27 escapes via suction means 14 and the blade 17 moves back into its initial position indicated in FIG. 2. The thread 2 now can be reinserted into the recess 21, whereupon the whole system is ready for action again.

Figure 6:
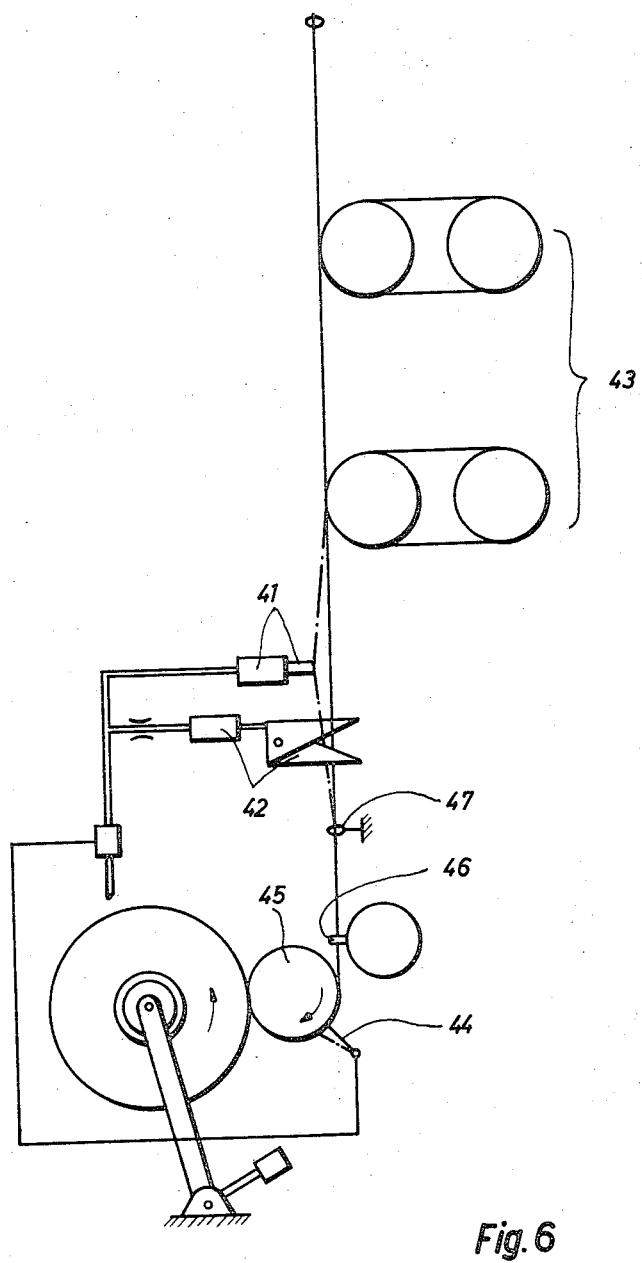
FIG. 6 illustrates a modified embodiment of the invention.

Referring to FIG. 6, the thread suction means 41 and the cutting means 42 can alternatively be arranged after the drawing device and the detection means 44 can be arranged at the drive roll 45 of the winding device. As the thread is traversed by the traversing thread guide 46 its movement extending up to the stationary thread guide 47, the suction means 41 and cutting means 42 must be arranged above this guide 46. A combination of the arrangements according to FIG. 1 and 6 on the very same spinning position also can be considered.

The function of this alternative arrangement is the same as that described above. Further, this alternative arrangement has an advantage in that the winding device is protected against lap formation and damages that could result from such a lap formation. Also, in this arrangement, after cutting, the thread remains threaded in the drawing device. As a result, the thread tension is maintained so that no laps can form in the drawing device which laps would otherwise immediately occur without the suction means as thread tension would be missing.

Referring to FIG. 7, wherein like reference characters indicate like parts as above, the hold means can also be constructed in a pneumatic fashion. To this end, the hold means includes a pressure cylinder 48 which is connected by a pressure pipe 49 to a suitable source of air pressure (not shown). A piston 50 is slidably disposed within the cylinder 48 and connects to a piston rod 51 which extends upwardly, as viewed, out of the cylinder 48 so as to press an end 52 thereof into the groove 28 of the piston rod 25 of the blade (not shown) of the cutting means (not shown). In addition, a spring 54 is disposed in the cylinder 48 below the piston 50 so as to bias the piston rod 50 against the piston rod 25. The pressure pipe 49 is disposed above the piston 50 so as to supply air into a room 53 disposed above of the piston 50.

In order to release the piston rod 25 so as to carry out a cutting action, air is conducted through the pipe 49 into the room 53 by a suitable means (not shown) activated by the detecting means (not shown). When the air pressure in the room 53 exceeds the force of the spring 54, the piston 50 will be retracted downwardly, thus moving the piston rod end 52 out of the groove 28 of the piston rod 25. The piston rod 25 will then be moved to the right as viewed due to the accumulation of the air pressure in the room 31 of the air pressure cylinder 27.

Referring to FIG. 8 wherein like reference characters indicate like parts as above, the hold means can alternatively be constructed as an electromagnetic means. To this end, an electromagnet 55 is secured to the air cylinder 27 and is provided with an axially movable iron core 56 which is connected to a rod 57. The rod 57 has an end 58 which is pressed into the groove 28 of the piston rod 25 of the cutting means (not shown) under a spring biasing force of a spring 59 as shown. In order to release the piston rod 25 to carry out a cutting action, the electromagnet 55 is activated by a suitable means (not shown) activated by the detecting means. Upon activation, the iron core 56 is pulled back against the spring force of the spring 59 so as to move the rod end 58 out of the groove 28. The air pressure within the room 31 of the air cylinder 27 is then allowed to move the piston rod 25 to the right as viewed.

Referring to FIG. 9, a thread cutting means 61 which incorporates a hold means as described in FIG. 7 therein is connected in common with a suction means, as above, to a common air supply duct. This duct is controlled by a valve 62 similar to the valve 16 described in FIG. 1. The valve 62 is activated by an impulse either manually or from a detection means provided at any place where a thread lap can occur in the machines mentioned above. The same impulse is also used to activate a timing element 63 connected to a solenoid valve 64 which times a supply of the compressed air to the pressure cylinder 48 by way of the pipe 49 which is also connected in common to the air duct with the suction means 60 and cutting means 61. The timing element 63 thus serves to time the cutting action of the cutting means 61.

Referring to FIG. 10 wherein like reference numerals as above indicate like parts, the cutting means 61 is provided with an electromagnetic hold means utilizing an electromagnet 55 as described above. Both a thread suction means 60 and the cutting means 61 are connected in common to an air supply duct as above. This duct includes a valve 62 which is activated by an impulse either manally or from a detection means while a timing element 63 for activating the electromagnet 55 is connected in common so as to be activated by the same impulse. The timing element 63 again times the cutting action of the cutting means 61.

In the embodiments shown in FIGS. 7 to 10, a suitable control means for timing the cutting action of the cutting means is provided. In the one case, the control means is electrically activated so as to permit a pneumatic operation of the hold means while in the other embodiment, the control means and hold means are electrically activated.

What is claimed is:

1. In combination,
a cutting means having a pivotally arranged cutting blade for severing a thread, a piston rod connected to said blade for pivoting said blade and means for moving said piston rod; and
control means for timing the actuation of said piston rod, said control means including a hold means for releaseably holding said piston rod in place and a timing element connected to said hold means for releasing said hold means from said piston rod.

2. In combination,
a cutting means having a movably arranged cutting blade for severing a thread, a piston rod connected to said blade for moving said blade and means for moving said piston rod; and
control means for timing the actuation of said piston rod, said control means including a hold means for releaseably holding said piston rod in place and a timing element connected to said hold means for releasing said hold means from said piston rod, said hold means including a pressure cylinder secured to said cutting means, a retractable piston in said cylinder for engaging in a groove in said piston rod and means for supplying air to said cylinder to move said piston away from said piston rod.

3. The combination as set forth in claim 2 wherein said hold means further includes a solenoid valve in said means for supplying air, said valve being electrically connected to said timing element to selectively permit a flow of air to said pressure cylinder in response to a predetermined impulse.

4. In combination,
a cutting means having a movably arranged cutting blade for severing a thread, a piston rod connected to said blade for moving said blade and means for moving said piston rod; and
control means for timing the actuation of said piston rod, said control means including a hold means for releaseably holding said piston rod in place and a timing element connected to said hold means for releasing said hold means from said piston rod, said hold means including an electromagnet secured to said cutting means for releaseably engaging said piston rod, said timing element being electrically connected to said electromagnet to selectively release said piston rod in response to a predetermined impulse.

5. In combination,
a cutting means having a plate containing a stationary cutting edge defining a recess for passage of a thread, a movably arranged cutting blade for severing a thread and having a cutting edge resting on said plate, a piston rod connected to said blade for moving said blade and means for moving said piston rod; and
control means for timing the actuation of said piston rod.

6. In combination,
a cutting means having a movably arranged cutting blade for severing a thread, a piston rod connected to said blade for moving said blade and means for moving said piston rod; and
a hold means for releaseably holding said piston rod in place, said hold means including at least one ball for engaging in a groove in said piston rod and a spring biasing said ball into said groove.

7. In combination,
a cutting means having a movably arranged cutting blade for severing a thread, a piston rod connected to said blade for moving said blade and means for moving said piston rod; and
a hold means for releaseably holding said piston rod in place, said hold means including a pressure cylinder secured to said cutting means, a retractable piston in said cylinder for engaging in a groove in said piston rod and means for supplying air to said cylinder to move said piston away from said piston rod.

8. In combination,
a cutting means having a movably arranged cutting blade for severing a thread, a piston rod connected to said blade for moving said blade and means for moving said piston rod; and
a hold means for releaseably holding said piston rod in place, said hold means including an electromagnet secured to said cutting means and having a retractable piston for releaseably engaging in a groove of said piston rod.

* * * * *

UNITED STATES PATENT OFFICE
CERTIFICATE OF CORRECTION

Patent No. 3,807,270                    Dated April 30, 1974

Inventor(s)  Armin Wirz

It is certified that error appears in the above-identified patent and that said Letters Patent are hereby corrected as shown below:

Column 1, line 6, after "1969" insert --now U.S. Patent 3,685,752--.

Column 2, line 2, after "speed" insert --textile--.

Column 8, line 1, delete "said" (first occurrence).

Signed and sealed this 8th day of October 1974.

(SEAL)
Attest:

McCOY M. GIBSON JR.                     C. MARSHALL DANN
Attesting Officer                       Commissioner of Patents